United States Patent
Lewellen et al.

[19]

[11] Patent Number: 6,067,328
[45] Date of Patent: May 23, 2000

[54] HIGH PRECISION HARDWARE CARRIER FREQUENCY AND PHASE AIDING IN A GPS RECEIVER

[75] Inventors: Guy Lewellen, Northants, United Kingdom; Rick Cooley, Overland Park, Kans.

[73] Assignee: AlliedSignal, Morristown, N.J.

[21] Appl. No.: 08/766,604

[22] Filed: Dec. 12, 1996

[51] Int. Cl.[7] .................................................. H03K 9/00
[52] U.S. Cl. ........................ 375/316; 375/373; 455/12.1
[58] Field of Search .................................. 375/316, 326, 375/327, 371, 373, 343, 376; 370/324; 455/456, 457, 12.1, 427, 313, 314; 342/356, 357, 358

[56] References Cited

U.S. PATENT DOCUMENTS

| | | | |
|---|---|---|---|
| 3,537,121 | 11/1970 | Lenen | 342/357 |
| 4,336,616 | 6/1982 | Frosch | 455/202 |
| 4,578,678 | 3/1986 | Hurd | 342/357 |
| 4,594,727 | 6/1986 | Pierce | 375/83 |
| 4,613,977 | 9/1986 | Wong | 375/97 |
| 4,651,154 | 3/1987 | Wong | 342/356 |
| 4,689,626 | 8/1987 | Hori | 342/357 |
| 4,691,176 | 9/1987 | Hsiung | 331/2 |
| 4,968,981 | 11/1990 | Sekine | 342/356 |
| 5,049,830 | 9/1991 | Yoshida | 329/306 |
| 5,150,384 | 9/1992 | Cahill | 375/97 |
| 5,175,729 | 12/1992 | Borras | 370/79 |
| 5,185,610 | 2/1993 | Ward et al. | 342/357 |
| 5,247,543 | 9/1993 | Tsuda | 375/97 |
| 5,402,442 | 3/1995 | Ishigaki | 375/200 |
| 5,402,450 | 3/1995 | Lennen | 375/343 |
| 5,535,278 | 7/1996 | Cahn et al. | 380/49 |
| 5,621,416 | 4/1997 | Lenen | 342/357 |
| 5,663,733 | 9/1997 | Lennen | 342/357 |
| 5,724,046 | 3/1998 | Martin et al. | 342/357 |
| 5,896,304 | 7/1997 | Tiemann et al. | 364/604 |
| 5,901,183 | 9/1996 | Garin et al. | 375/343 |

FOREIGN PATENT DOCUMENTS

| | | | |
|---|---|---|---|
| 0 467 651 A1 | 1/1992 | France | H04B 7/185 |

*Primary Examiner*—Chi H. Pham
*Assistant Examiner*—Emmanuel Bayard

[57] ABSTRACT

A GPS system (12) including an antenna (12), a GPS receiver (14), and a baseband subsystem (16) is disclosed. The receiver (14) includes a reference clock (20), a down converter (22), and a baseband detector (24). The baseband detector (24) is coupled with the output of the down converter (22) and includes a numerically controlled oscillator (30), an adder circuit (32), a code generator (34), a code mixer (36), and a carrier mixer (38). The adder (32) corrects errors caused by clock errors generated by the receiver's reference clock (20) as they occur by adding a clock correction frequency to the oscillator (30) signals.

22 Claims, 1 Drawing Sheet

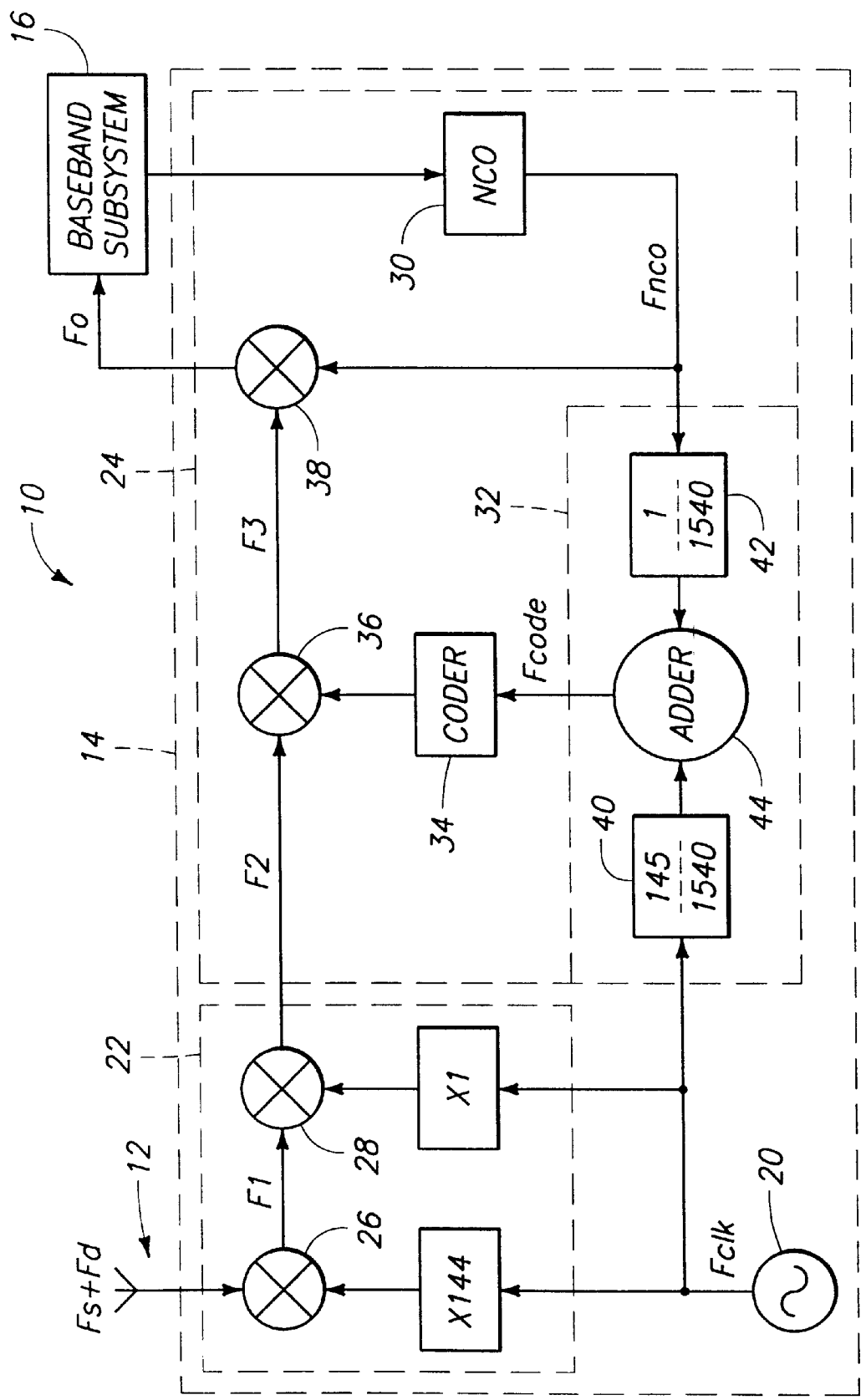

HIGH PRECISION HARDWARE CARRIER FREQUENCY AND PHASE AIDING IN A GPS RECEIVER

BACKGROUND OF THE INVENTION

1. Field of the Invention

The present invention relates to global positioning system (GPS) receivers operable for navigating and tracking vehicles. More particularly, the invention relates to a method and apparatus for correcting errors in the receiver's code phase measurement caused by clock errors introduced during downconversion of the received satellite signals.

2. Description of the Prior Art

GPS satellites include highly accurate on-board atomic clocks for timing the transmission of their navigation and code signals. GPS receivers receive the satellite signals, downconvert the received signals to intermediate frequency signals, generate replica signals to track or match the downconverted signals, and shift the phase of the generated replica signals until a match or phase lock is obtained. Once phase lock is obtained, the receiver reads the navigation signals to calculate the Doppler frequency of the GPS receiver relative to the satellite.

Unfortunately, the reference clocks on GPS receivers are not as accurate as the atomic clocks on-board the GPS satellites. Therefore, these reference clocks introduce clock errors into the code phase matching, especially during the downconversion of the received code signals.

Known prior art GPS receivers compensate for these reference clock errors by measuring the carrier phase errors with phase lock loop software and periodically adjusting the phase of the replica code generator to eliminate the measured errors. These prior art methods are limited, however, because they do not continuously compensate for the clock errors as they occur. Instead, the phase errors are only corrected after the accumulated phase difference reaches a predetermined value. Thus, prior art GPS receivers do not adequately compensate for reference clock errors, and as a result, often cannot achieve high precision tracking and navigation.

SUMMARY OF THE INVENTION

The present invention solves the prior art problems discussed above and provides a distinct advance in the art of GPS receivers. More particularly, the invention hereof provides an apparatus and method for instantaneously correcting errors in a GPS receiver's code phase measurement caused by reference clock errors as they occur.

The preferred GPS system broadly includes an antenna, a GPS receiver, and a baseband subsystem. The receiver includes a reference clock, a downconverter, and a baseband detector. The baseband detector is coupled with the output of the downconverter and includes a numerically controlled oscillator, an adder circuit, a code generator, a code mixer, and a carrier mixer.

The preferred GPS system corrects errors in the GPS receiver's code phase measurement caused by the reference clock as they occur. First, the antenna receives satellite signals from one or more GPS satellites. The downconverter then downconverts the received satellite signals to intermediate frequency signals.

The reference clock drives the downconverter with clock signals. However, as described above, the reference clock is subject to variations that introduce clock errors to the clock signals. These clock errors are introduced to the downconverter and are carried forward to the baseband detector.

The baseband detector samples the downconverted signals and generates replica signals for tracking the satellite signals. Specifically, the numerically controlled oscillator and the code generator generate code and carrier signals that are replicas of the code and carrier portions of the downconverted signals.

To achieve phase lock, the numerically controlled oscillator is driven so that its frequency equals the frequency of the downconverted satellite signals. The numerically controlled oscillator also drives the code generator. This subjects the code generator to the clock errors because, as described above, the clock errors are introduced during downconversion of the satellite signals and duplicated by the numerically controlled oscillator. If these clock errors are left uncorrected, the code generator would generate accumulating out-of-phase replica code signal errors, and the code mixer would compare these out-of-phase replica code errors with the actual satellite code signals, which are not subject to the reference clock errors, resulting in phase comparison errors.

The adder eliminates these phase comparison errors by adding clock correction signals to the oscillator signals. The clock correction signals are proportional to the clock errors, therefore the clock errors in the oscillator signals are cancelled out in the adder. In preferred forms, the clock correction signals are generated by the reference clock and delivered to the adder at the same time they are delivered to the downconverter. The adder circuit scales the clock correction and oscillator signals by appropriate scaling factors, adds the two signals together to remove the clock errors, and drives the code generator with the combined, error-free signals.

Since the reference clock signals simultaneously drive the downconverter and provide the clock correction signals, the clock errors that are introduced into the code phase measurement during downconversion also supply the clock correction signals to the adder. Thus, the adder instantaneously eliminates the clock errors as they occur. This provides instantaneous code phase error correction rather than periodic correction provided by prior art systems. Thus, the present method and apparatus provides more precise navigating and tracking with significantly reduced computer processing.

BRIEF DESCRIPTION OF THE DRAWING FIGURE

The single drawing FIGURE is a block diagram representing a GPS receiver constructed in accordance with a preferred embodiment of the present invention.

DETAILED DESCRIPTION OF A PREFERRED EMBODIMENT

The drawing FIGURE illustrates a preferred GPS system 10, which broadly includes antenna 12, GPS receiver 14, and baseband subsystem 16. As described in more detail below, the method of the present invention operates GPS system 10 for eliminating clock errors introduced into the code phase measurement of receiver 14.

In more detail, antenna 12 is preferably manufactured by Allied Signal of Olathe, Kans. and is operable for receiving satellite signals from one or more GPS satellites. In preferred forms, antenna 12 includes filters and amplifiers for filtering and amplifying the received satellite signals. The antenna delivers the filtered and amplified satellite signals to GPS receiver 14 as described below.

GPS satellites transmit signals derived from the fundamental frequency of 10.23 MHZ generated by the satellites' on-board atomic clocks. Satellite transmissions include navigation signals L1 and L2 transmitted at frequencies of 1,575.42 MHZ and 1,227.6 MHZ, respectively, a precision P code transmitted at a frequency of 10.23 MHZ, and a coarse acquisition C/A code transmitted at a frequency of 1.023 MHZ.

Antenna 12 receives these satellite signals at a frequency of Fsat that includes the actual satellite transmission frequency Fs and the Doppler shift frequency Fd. The satellite frequency Fs may be any one of the navigation or code signals, for example the 1575.42 MHZ L1 signal. The Doppler shift frequency Fd represents the apparent motion between the in-view satellite and receiver 14.

GPS receiver 14 is preferably a GPS XPRESS model receiver manufactured by Allied Signal of Olathe, Kans., or an equivalent GPS receiver. As illustrated, GPS receiver 14 broadly includes reference clock 20, down converter 22, and baseband detector 24.

Reference clock 20 is preferably a temperature compensated crystal oscillator (TCXO) manufactured by Allied Signal. Clock 20 drives downconverter 22 for downconverting the received satellite signals and provides clock correction signals to baseband detector 24 as described below.

Clock 20 is nominally tuned to a clock frequency Fclk of 10.857 MHZ, but is subject to variations due to imperfections in its crystal. Thus, clock 20 also generates clock error frequencies Fe that are combined with the Fclk signals. Because clock 20 drives downconverter 22, these clock errors Fe are introduced into the code phase measurement of receiver 14.

Down converter 22 converts the received satellite signals Fs+Fd to lower frequency, intermediate signals F2 for processing by baseband detector 24. Downconverter 22 is preferably a two-stage downconverter and includes mixer 26 and mixer 28.

Mixer 26 mixes or subtracts the reference clock signals (Fclk+Fe)*144 from the incoming satellite signals Fs+Fd, resulting in downconverted signals F1=(Fs+Fd)−144(Fc+Fe). Mixer 28 then mixes or subtracts the reference clock signals Fclk+Fe from F1, resulting in downconverted signals F2=(Fs+Fd)−145(Fc+Fe). Those skilled in the art will appreciate that downconverter 22 may also be a single, triple or other stage downconverter having any number of mixers.

Baseband detector 24 is coupled with the output of downconverter 22 for receiving and processing downconverted signals F2 and includes numerically controlled oscillator 30, adder circuit 32, code generator 34, code mixer 36, and carrier mixer 38. In general, baseband detector 24 receives and samples the down converted signals F2 from downconverter 22 and creates replica signals used for tracking and obtaining phase lock loop of the satellite signals.

In more detail, numerically controlled oscillator 30 generates oscillator signals Fnco that are replicas of the downconverted satellite carrier signals. The Fnco signals are delivered to carrier mixer 38 and to adder circuit 32 as described below.

Baseband system 16 attempts to drive numerically controlled oscillator 30 so that the Fnco signals equal the downconverted signals F2, or(Fs+Fd)−145*(Fc+Fe). This ensures that the carrier replica signals are in phase with the downconverted satellite signals so that the output of carrier mixer 38 is zero.

However, if this same frequency Fnco is supplied directly to code generator 34, code generator 34 will not be in phase with the received satellite code signals because of the clock error signals Fe introduced during downconversion. Particularly, as stated above, the Fnco signals are driven so that they equal (Fs+Fd)−145+(Fc+Fe), whereas the actual received satellite code signals equal (Fs+Fd)/1540. Thus, if left uncorrected, the clock errors would cause the code generator 34 to drift out-of-phase with the received satellite code signals, resulting in comparison errors in code mixer 36.

Applicant has discovered that these clock errors can be instantaneously compensated for by adding clock correction signals to the oscillator signals Fnco. Reference clock 20 sends these clock correction signals to adder circuit 32 which adds the clock correction signals to the oscillator signals. As illustrated, adder circuit is coupled between reference clock 20 and code generator 34 and includes divider 40, divider 42, and adder 44.

Divider 40 is coupled between reference clock 20 and adder 44 and scales Fclk by a factor of 145/1540. This provides a clock correction signal to adder 44 that equals (Fc+Fe)*145/1540.

Divider 42 is coupled between numerically controlled oscillator 30 and adder 44 and divides Fnco by 1540. This reduces or downconverts the oscillator signals to a frequency equal to (Fs+Fd)/1540−(Fc+Fe)*145/1540. Adder 44 then adds the outputs from dividers 40,42 together to obtain Fcode for driving code generator 34.

Thus, code generator 34 is driven by Fcode, where:

$$Fcode=(Fnco/1540)+(Fclk* \ 145/1{,}540).$$

The terms Fnco, which equals (Fs+Fd)−145(Fc+Fe), and Fclk, which equals Fc+Fe, are expanded, resulting in:

$$Fcode=(Fs+Fd)/1540-Fc+Fe)*145/1540+(Fc+Fe)*145/1540.$$

The last two terms of the above equation cancel out, resulting in:

$$Fcode=(Fs+Fd)/1540,$$

which, as described above, is the satellite code frequency needed to keep code generator 34 in phase with the downconverted satellite code signals.

Code generator 34 is driven by the Fcode signals for generating replica code signals. The replica code signals are then sent to code mixer 36 where they are mixed with the received satellite code signals.

The Fnco signals are also sent directly to carrier mixer 38 where they are mixed with the incoming F2 signals. Mixers 36 and 38 subtract the replica signals from the F2 signals resulting in in-phase (I) and out-of-phase or quadrature (Q) amplitude samples of the F2 signals. The I and Q samples represent the frequency and phase difference or error between the generated replica signals and the incoming F2 signals.

Baseband detector 24 may also include phase shifters, signal integrators and other conventional receiver components not shown. In preferred forms, baseband detector 24 is an application specific integrated circuit including 8 channels for processing I and Q signal samples in parallel from 8 satellites.

Baseband subsystem 16 is preferably an EPROM electrically coupled with baseband detector 24 but may also include other conventional memory storage and data processing devices. Baseband subsystem 16 receives the I and Q measurements from baseband detector 24 and implements a phase lock loop tracking routine to lock the replicated signals generated by baseband detector 24 with the incoming IF signals. The phase lock loop tracking routine of the present invention is preferably implemented by phase lock loop software stored in baseband subsystem 16.

The phase lock loop software processes the cumulated I and Q measurements to determine the error or difference in the phase and frequency between the incoming IF signals and the replica signals generated by numerically controlled oscillator 30 and code generator 34. The GPS system 10 of the present invention preferably uses a second-order phase lock loop; however, any order of phase lock loop may be utilized, including third and fourth order phase lock loops.

After determining these errors, the phase lock loop software creates and transmits frequency and phase shift commands to baseband detector 24 to alter the phase and frequency of the generated replica signals generated by numerically controlled oscillator 30 and code generator 34. This loop is continued until the generated replica signals match or track the downconverted F2 signals, resulting in phase lock loop. GPS system 10 may also include a position, velocity, time (PVT) subsystem (not shown) for adjusting the bandwidth of the above-described phase lock loop.

In operation, GPS system 10 continuously corrects errors in the receiver's code phase measurement caused by clock errors generated by reference clock 28 as they occur. First, antenna 12 receives satellite signals from one or more GPS satellites. Downconverter 22 downconverts the received satellite signals to intermediate frequency signals F2. Reference clock 28 drives downconverter 22 with clock signals. However, as described above, reference clock 20 is subject to variations that introduce clock errors to the clock signals.

Baseband detector 24 samples the downconverted signals and generates replica signals for tracking the satellite signals. Specifically, numerically controlled oscillator 30 and code generator 34 generate replica code and carrier signals of the downconverted signals.

To achieve phase lock loop, numerically controlled oscillator 30 is driven so that its frequency equals the frequency of the downconverted satellite signals. Numerically controlled oscillator also drives code generator 34. This subjects code generator 34 to the clock errors because the downconverted signals and thus the oscillator signals include the clock errors generated by reference clock 20. Without adder 32, code generator 34 would generate accumulating out-of-phase replica code signal errors and code mixer 34 would compare the out-of-phase replica code signal errors with the error-free received satellite code signals, resulting in comparison errors associated with the clock errors.

Adder 32 eliminates these comparison errors by adding clock correction signals proportional to the clock errors to the oscillator signals. The clock correction signals are generated by reference clock 20 and then added to the oscillator signals. Adder circuit 32 scales the signals by appropriate scaling factors, adds the two signals together for eliminating the clock errors, and drives code generator 34 with the combined error-free signals.

Since reference clock 28 generates both the timing for downconverter 22 and the clock correction signals for adder 32, the clock errors that are introduced into the code phase measurement during downconversion are also introduced into adder circuit 32. The adder circuit 32 eliminates the clock errors by canceling them out with the clock correction signals. Therefore, the clock errors are corrected as they occur. This provides instantaneous code phase error correction rather than periodic correction provided by prior art systems. Thus, the present method and apparatus provides more precise navigating and tracking with significantly reduced computer processing.

Although the invention has been described with reference to the preferred embodiment illustrated in the attached drawing figures, it is noted that equivalents may be employed and substitutions made herein without departing from the scope of the invention as recited in the claims. For example, although adder 32 is preferably implemented in hardware, it could also be implemented in software.

Having thus described the preferred embodiment of the invention, what is claimed as new and desired to be protected by Letters Patent includes the following:

1. In a Global Positioning System (GPS) receiver including a reference clock, a method of eliminating errors in the code phase measurement of the receiver caused by clock errors of the reference clock, said method comprising the steps of:

receiving satellite signals from a GPS satellite;

downconverting said received satellite signals with downconverting means for generating downconverted signals;

driving said downconverting means with clock signals generated by said reference clock, said reference clock being subject to variations that introduce clock errors to said clock signals and therefore to said downconverted signals;

generating replica code signals of said downconverted signals with code generating means;

driving said code generating means with oscillator signals generated by oscillator means;

comparing said replica signals with said received satellite signals with comparing means, said comparing step being subject to comparison errors associated with said clock errors of said downconverted signals; and eliminating said comparison errors by adding clock correction signals to said oscillator signals for driving said code generating means, said clock correction signals being proportional to said clock errors.

2. The method as set forth in claim 1, said eliminating step including the step of canceling out said clock errors with said clock correction signals.

3. The method as set forth in claim 2, wherein said clock correction signals are generated by said reference clock.

4. The method as set forth in claim 1, wherein said clock correction signals are a fraction of said clock signals.

5. The method as set forth in claim 1, including adding means for adding said clock correction signals to said oscillator signals for driving said code generating means.

6. The method as set forth in claim 1, said downconverting means including a two-stage downconverter.

7. The method as set forth in claim 1, said satellite signals including coarse acquisition codes.

8. The method as set forth in claim 6, said generating means including a digital coarse acquisition code generator.

9. The method as set forth in claim 1, said comparing means including a digital mixer.

10. The method as set forth in claim 1, said oscillator means including a numerically controlled oscillator.

11. In a Global Positioning System (GPS) receiver including a reference clock, a method of eliminating errors in the code phase measurement of the receiver caused by clock errors of the reference clock, said method comprising the steps of:

receiving satellite code signals from a GPS satellite;

downconverting said received satellite code signals with a downconverter for generating downconverted signals;

driving said downconverter with clock signals generated by a reference clock, said reference clock being subject to variations that introduce clock errors to said clock signals and therefore to said downconverted signals;

generating replica signals of said downconverted signals with a digital code generator;

driving said code generator with oscillator signals generated by a numerically controlled oscillator;

comparing said replica signals with said downconverted signals with a digital mixer, said comparing step being subject to comparison errors associated with said clock errors of said downconverted signals; and eliminating said comparison errors by adding clock correction signals to said oscillator signals in an adder circuit, said clock correction signals being generated by said reference clock and being proportional to said clock signals, said clock correction signals canceling out said clock errors.

12. The method as set forth in claim 11, wherein said clock correction signals are a fraction of said clock signals.

13. The method as set forth in claim 11, said downconverting means including a two-stage downconverter.

14. The method as set forth in claim 11, said satellite code signals including course acquisition codes.

15. The method as set forth in claim 11, said generating means including a digital coarse acquisition code generator.

16. The method as set forth in claim 11, said comparing means including a digital mixer.

17. The method as set forth in claim 11, said oscillator means including a numerically controlled oscillator.

18. The method as set forth in claim 11, said downconverter being a two-stage downconverter.

19. A Global Positioning System (GPS) comprising:

a GPS receiver having a reference clock configured to produce a clock signal $F_{clk}$ having an error frequency $F_e$;

a downconverter operably coupled with the reference clock and configured to be driven therby and to downconvert signals which are received from a transmitting satellite; and a baseband detector operably coupled with both the downconverter and the reference clock, wherein the baseband detector is configured to receive the clock signal $F_{clk}$ having the error frequency $F_e$, to generate a signal which is a replica of the downconverted signal, and to combine the clock signal $F_{clk}$ and the replica of the downcoverted signal to obtain a combined signal, wherein said combined signal is fed back to said baseband detector in a manner which removes the error frequency $F_e$.

20. A Global Positioning System (GPS) comprising:

a GPS receiver having a reference clock configured to produce a clock signal $F_{clk}$ having an error frequency $F_e$;

a downconverter operably coupled with the reference clock and configured to be driven thereby and to downconvert signals which are received from a transmitting satellite;

a baseband detector operably coupled with both the downconverter and the reference clock, wherein the baseband detector is configured to receive the clock signal $F_{clk}$ having the error frequency $F_e$, to generate a signal which is a replica of the downconverted signal, and to combine the clock signal $F_{clk}$ and the replica of the downcoverted signal in a manner which removes the error frequency $F_e$; and wherein the baseband detector comrpises an adder circuit which is configured to combine the clock signal $F_{clk}$ and the replica of the downconverted signal.

21. A Global Positioning System (GPS) comprising:

a GPS receiver having a reference clock configured to produce a clock signal $F_{clk}$ having an error frequency $F_e$;

a downconverter operably coupled with the reference clock and configured to be driven thereby and to downconvert signals which are received from a transmitting satellite;

a baseband detector operably coupled with both the downconverter and the reference clock, wherein the baseband detector is configured to receive the clock signal $F_{clk}$ having the error frequency $F_e$, to generate a signal which is a replica of the downconverted signal and to combine the clock signal $F_{clk}$ and the replica of the downcoverted signal in a manner which removes the error frequency $F_e$; and wherein the baseband detector comprises an adder circuit which is configured to combine fractions of the clock signal $F_{clk}$ and the replica of the downconverted signal.

22. The Global Positioning System of claim 19, wherein the baseband detector comprises a numerically-controlleroscillator which is configured to generate the signal which is a replica of the downconverted signal.

* * * * *